(No Model.)
W. COHLMAN.
CONDUIT FOR ELECTRICAL CONDUCTORS.
No. 319,197. Patented June 2, 1885.
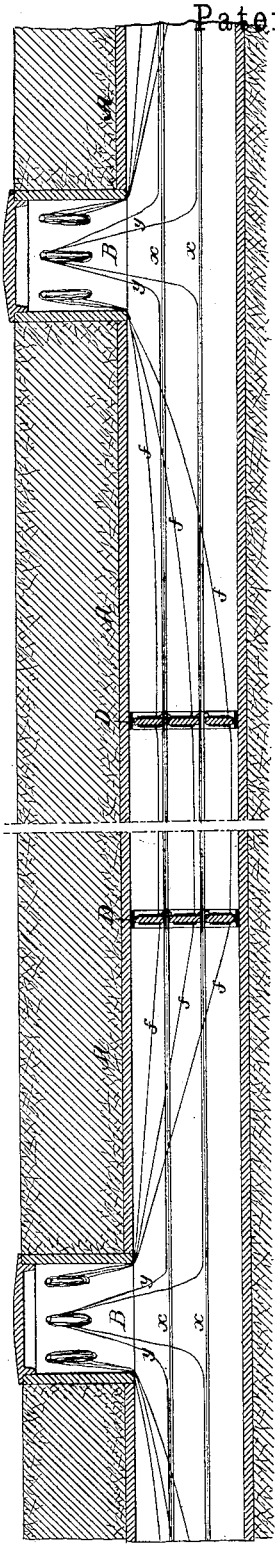
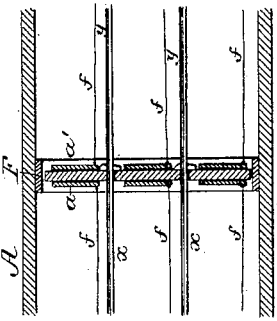
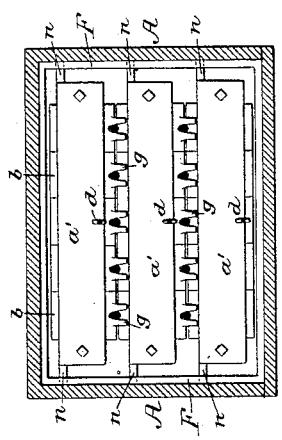
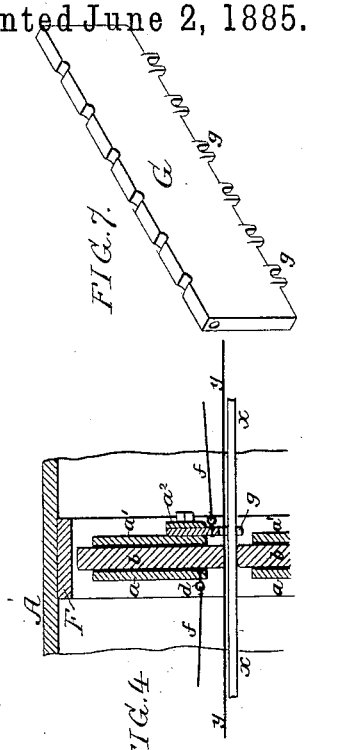
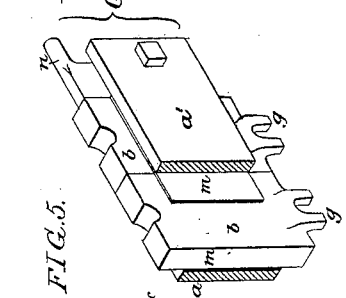
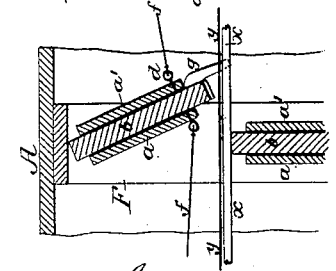
Witnesses
E. A. Happersett
Henry Bossert.
Inventor.
William Cohlman
by his Attorneys
Howson & Sons

UNITED STATES PATENT OFFICE.

WILLIAM COHLMAN, OF PHILADELPHIA, PENNSYLVANIA.

CONDUIT FOR ELECTRICAL CONDUCTORS.

SPECIFICATION forming part of Letters Patent No. 319,197, dated June 2, 1885.

Application filed March 23, 1885. (No model.)

*To all whom it may concern:*

Be it known that I, WILLIAM COHLMAN, a citizen of the United States, and a resident of Philadelphia, Pennsylvania, have invented certain Improvements in Conduits for Electrical Conductors, of which the following is a specification.

The objects of my invention are to cheapen the construction of the wire-supporting bridges of the conduit and to facilitate the insertion and removal of wires. These objects I attain in the manner hereinafter set forth, reference being had to the accompanying drawings, in which—

Figure 1 is a longitudinal section of part of a conduit with wire-supporting bridges in accordance with my invention; Fig. 2, a front view of one of said bridges on a larger scale; Fig. 3, a section on the same scale as Fig. 2; Figs. 4 and 5, sections on a still larger scale of part of the bridge; Fig. 6, a perspective view of part of one of the bridge-plates, and Fig. 7 a perspective view of a modified form of bridge-plate.

A represents the casing of the conduit, which may be of iron, terra-cotta, or any other suitable material, and of any desired shape in cross-section, and which has at intervals the usual man-holes or working-chambers, B.

In the conduit between the man-holes are a series of wire-supporting bridges, D, the number of these bridges in each section of the conduit depending upon the length of said section and the number of wires carried. Each bridge consists of a frame, F, which is fitted to the conduit, and carries a number of pivoted bridge-plates, G, each of the latter consisting, in the present instance, of opposite plates, $a$ $a'$, of metal, between which are clamped a series of blocks, $b$, of glass, porcelain, or other insulating material, notched on the upper and lower edges, as shown, so as to form openings for the reception of the wires.

Sheets $m$ of rubber are preferably interposed between the blocks $b$ and plates $a$ $a'$, to insure the firm clamping of the blocks, the plates being drawn together at each end by suitable bolts and nuts, and the plate $a$ having pivot-pins $n$, whereby the bridge-plate is hung to the frame F.

Near the lower edge of each of the plates $a$ $a'$ is an eye, $d$, the eyes of all of the supports being connected by a cord or wire, $f$, and a similar cord running from each of the end bridge-plates of the series to the adjacent man-hole, so that by pulling upon said cord or wire any series of bridge-plates can be swung upward, as shown in Fig. 4, so as to release the wires between the same and the bridge-plates beneath, and permit any one of said wires to be drawn through the conduit or a new wire to be drawn through any one of the openings. In order to prevent the release of the wires from lateral guidance or control, however, on swinging up the bridge-plate, fingers $g$ project downward on each side of the opening in the lower edge of each block $b$, the length of these fingers being such that when the bridge-plate is lifted to its full height the ends of the fingers will still embrace and laterally retain the wires, as shown in Fig. 4.

In order to provide for the pulling of a wire in either direction to a man-hole in the event of a break or defect in the wire at any point in the conduit between man-holes, each wire $x$ has with it a fine drawing-wire, $y$, which extends throughout the length of the main wire, and has in each man-hole chamber slack equal to the length of conduit between the man-holes.

In the event of a break or defect at any point between man-holes, the bridge-plates holding the wire can be lifted by the wire $f$, the wire $x$ cut at one man-hole, and the length in which is the defect drawn by the wire $y$ to the opposite man-hole, where the defect can be repaired or a new section substituted for the defective one, the end being then drawn back to the first man-hole and spliced onto the other end of the wire. Each wire is thus under perfect control throughout its entire length, and can be examined and repaired with almost as much facility as an overhead suspended wire.

The guide-fingers $g$ may be molded on the blocks $b$, if desired, or they may be clamped onto the plate $a'$ by another plate, $a^2$, in the same manner as the blocks $b$ are clamped by said plates $a$ $a'$, both of these methods being illustrated in the drawings, and in some cases each bridge-plate may consist of a single piece, Fig. 7, having openings for the reception of pins, whereby it can be pivoted to the frame, the sectional construction shown in Fig. 6 being preferred, however, as it reduces the cost of construction and repairs, the series of small blocks *b* costing less than a large block, and necessitating the replacing of but a small piece in the event of any part of the bridge-plate being damaged.

The bridge-plates need not be notched for the reception of the wires, although such notches are preferred, as the tension on the wires cannot in all cases be relied upon to keep them in a straight line.

I claim as my invention—

1. The combination of a conduit with pivoted plates forming the wire-supporting bridges, all substantially as specified.

2. The combination of a conduit with pivoted plates forming the wire-supporting-bridges and having notches for the reception of the wires, as set forth.

3. The combination of a conduit with wire-supporting bridge-plates consisting of a series of blocks of insulating material held in position between opposite clamp-plates, as specified.

4. The combination of the conduit with the pivoted plates forming the wire-supporting bridges and having projecting fingers for the lateral guidance and retention of the wires, as set forth.

5. The combination of the conduit and its man-hole chambers with pivoted plates forming a series of wire-supporting bridges, and with wires *f*, connecting the plates of the series together and extending to the man-hole chambers, as specified.

6. The combination of a frame adapted to the conduit with plates pivoted to said frame and forming wire-supporting bridges, as set forth.

7. The combination of the bridge-plates with clamp-plates *a a'*, one of which is provided with pivot-pins, as specified.

8. The combination of the conduit and its notched or perforated supports with a series of conductors, *x*, adapted to the notches or perforations of said supports, and a series of drawing-wires, *y*, one for each of said wires *x*, as set forth.

In testimony whereof I have signed my name to this specification in the presence of two subscribing witnesses.

WILLIAM COHLMAN.

Witnesses:
  HENRY BOSSERT,
  HARRY SMITH.